(12) United States Patent
Chang-Fa

(10) Patent No.: US 6,169,587 B1
(45) Date of Patent: Jan. 2, 2001

(54) RASTER V-SIZE ADJUSTMENT CIRCUIT

(75) Inventor: Hsieh Chang-Fa, Taoyuan (TW)

(73) Assignee: Acer Peripherals Inc. (TW)

(*) Notice: Under 35 U.S.C. 154(b), the term of this patent shall be extended for 0 days.

(21) Appl. No.: 08/828,613

(22) Filed: Mar. 31, 1997

(51) Int. Cl.$^7$ .............................. H04N 3/23; H04N 5/68; H04N 9/16

(52) U.S. Cl. ...................... 348/805; 348/746; 348/747; 348/380; 315/8

(58) Field of Search ................................. 348/805, 746, 348/747, 806, 377, 379, 380, 366; 315/3, 5.24, 5.34, 5.38, 8, 14, 364, 369, 370, 386, 387, 399, 405, 411; H04N 3/23, 5/68, 9/16

(56) References Cited

U.S. PATENT DOCUMENTS

| | | | |
|---|---|---|---|
| 4,607,288 | * | 8/1986 | Freyberger ........................ 348/806 |
| 4,870,331 | * | 9/1989 | Heinzerling ...................... 348/747 |
| 4,870,490 | * | 9/1989 | Sekiya et al. .................... 348/540 |
| 5,619,285 | * | 4/1997 | Koybayashi ..................... 348/806 |
| 5,898,467 | * | 4/1999 | Woo ................................ 348/806 |
| 6,011,593 | * | 1/2000 | Onozawa et al. ................ 348/556 |

FOREIGN PATENT DOCUMENTS

08046808 * 2/1996 (JP).

* cited by examiner

Primary Examiner—John K. Peng
Assistant Examiner—Linus H. Lo
(74) Attorney, Agent, or Firm—Fulbright & Jaworski L.L.P.

(57) ABSTRACT

A circuitry for attaining a fixed raster vertical scan size of a video display apparatus is proposed. The video display apparatus comprises a flyback transformer (FBT) which includes a primary winding and a secondary winding. The secondary winding has a terminal generating a high voltage to an anode of a cathode ray tube (CRT) of the video display apparatus via an external loading. Moreover, the secondary winding has a voltage reference terminal. The raster vertical scan size adjustment circuit comprises a compensation circuit and a raster vertical scan size control circuit. The compensation circuit includes an input terminal adapted to connect the voltage reference terminal of the secondary winding for detecting voltage change at the voltage reference terminal responsive to variation of the external loading. The compensation circuit has an output terminal generating the compensated signal. The raster vertical scan size control circuit, responsive to the compensated signal, adjusts the raster vertical scan size of the video displayed on the CRT such that the raster vertical scan size is substantially maintained.

9 Claims, 1 Drawing Sheet

RASTER V-SIZE ADJUSTMENT CIRCUIT

FIELD OF INVENTION

Figure 1:
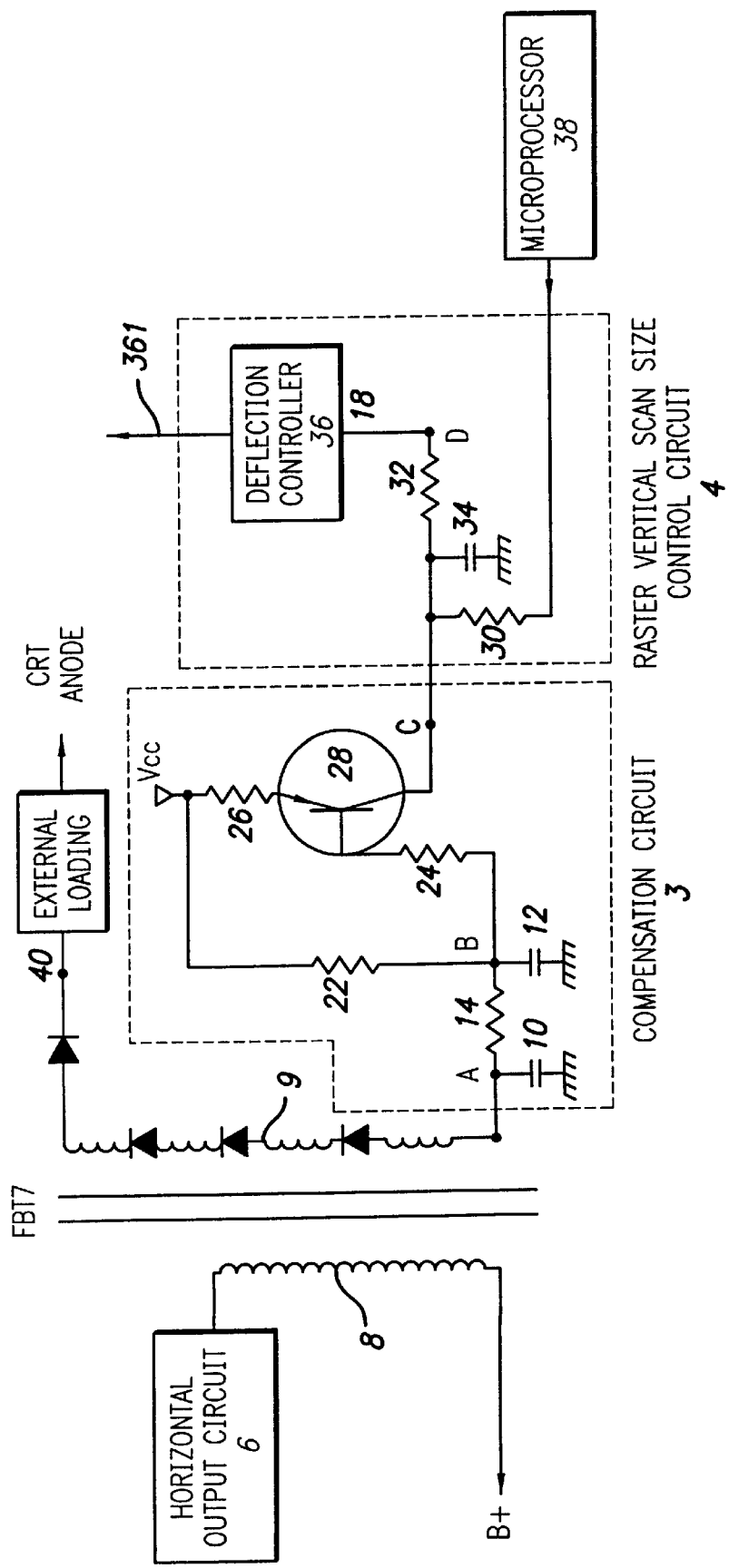

The invention relates to a video display apparatus using a cathode ray tube (CRT), and is particularly concerned with a circuit for adjusting the raster vertical scan size such that a constant raster vertical scan size is substantially maintained.

BACKGROUND OF INVENTION

It is well known that a video display apparatus employing a CRT generates a desired video on the CRT by horizontal and vertical deflection operation of the electron beam selectively impinged on the inner surface of the CRT. In modern digitally controlled CRT-type display apparatus, a microprocessor generates a pulse width modulation (PWM) signal to a digital-to-analog converter (DAC). The control current outputted by the DAC then is inputted to a deflection controller which, in turn, control the vertical scan size of the raster.

In particular, other than expected adjustment instructed by the user of the display apparatus, the vertical scan size of the raster, as well known in the arts, is unexpectedly affected by variation of an external loading, e.g. a variable resistor controlling the brightness of the video displayed on the CRT. The unexpected vertical scan size change, as well known in the arts, is caused by change of high voltage, due to change of the external loading, applied to the anode of the CRT. When the loading becomes heavier, the high voltage to anode can not be maintained at a fixed value. If the high voltage becomes lower, the vertical scan size becomes larger.

In other words, as a critical user adjusts the brightness of the video, unexpected minor change of the raster vertical scan size is perceived by the critical user. Therefore, it is desirable to attain a fixed raster vertical scan size of the video regardless of variation of the brightness.

To overcome the mentioned drawback, one conventional approach utilizing a high voltage regulation loop to maintain a constant high voltage applied to the anode, regardless of change of the external loading, has been implemented. Even though such approach is technically feasible in solving the above-mentioned problem, however, the cost associated with this conventional approach is high. Furthermore, the required physical dimension of the conventional implementation is significant.

The main object of the instant invention is to provide a cost effective alternative to prevent unexpected raster vertical scan size change while a smaller physical dimension is achieved.

A raster vertical scan size adjustment circuit is provided in which a compensated signal, e.g. voltage, responding to variation of the external loading is generated.

SUMMARY OF INVENTION

A raster vertical scan size adjustment circuit including a compensation circuit and a raster vertical scan size control circuit is provided.

The compensation circuit consists of a filter and a compensation network. The compensation network has an input terminal, adapted to connect a voltage reference terminal of a secondary winding of a flyback transformer (FBT).

The raster vertical scan size control circuit consists of a digital-to-analog converter (DAC) and a deflection controller. The DAC has a first input terminal connected to the output terminal of the compensation network, an output terminal generating a control signal, and a second input terminal receiving a PWM signal generated by a microprocessor. The deflection controller has an input terminal receiving the control signal and an output terminal controlling the raster vertical scan size.

BRIEF DESCRIPTION OF THE APPENDED DRAWINGS

FIG. 1 illustrates the preferred embodiment of the invention.

DETAILED DESCRIPTION OF THE INVENTION

A preferred embodiment of the present invention will be described below with reference to FIG. 1, wherein reference numerals are used to designate the parts and components shown in the figure.

The video display apparatus, as a traditional one, includes a flyback transformer (FBT) 7 which includes a primary winding 8 and a secondary winding 9. The secondary winding 9 has a terminal 40 generating a high voltage to an anode of a cathode ray tube (CRT) of the video display apparatus via an external loading, e.g. a variable resistor controlling the brightness of the video displayed on the CRT. The secondary winding 9 has a voltage reference terminal A. The primary winding 8 has a terminal connected to the horizontal output circuit 6. The primary winding 8 has a terminal connected to the B+ (power supply). As depicted in FIG. 1, the preferred embodiment of invention consists of a compensation circuit 3 and a raster vertical scan size control circuit 4.

The compensation circuit 3 consists of a filter including capacitors 10, 12, a resistor 14 and a compensation network, e.g. resistors 22, 24, 26 and a PNP transistor 28. The filters of the compensation circuit function to remove the spike generated during the operation of the horizontal output circuit 6. Without these filters, the spike will be sensed at the voltage reference terminal A of the secondary winding 9. A filtered signal, which is outputted at the output terminal B of the filter, is the input signal to the compensation network. A first terminal of the capacitor 10 is connected to the voltage reference terminal A of the secondary winding 9. A second terminal of the capacitor 10 is connected to the common ground. A first terminal of the capacitor 12 forms the output terminal B of the filter. A secondary terminal of. the capacitor 12 is connected to the common ground. The resistor 14 is arranged between the voltage reference terminal A of the secondary winding 9 and the output terminal B of the filter.

A preferred compensation network is comprised of resistors 22, 24, 26 and a PNP transistor 28. The compensation network has an output terminal C generating the compensated signal, e.g. voltage, based on voltage variation at the output terminal B of the filter. As shown in FIG. 1, the resistor 22 is arranged between a DC power $V_{cc}$ and the output terminal B of the filter. The resistor 24 is arranged between a base terminal of the PNP transistor 28 and the output terminal B of the filter. The resistor 26 is arranged between the DC power $V_{cc}$ and an emitter terminal of the PNP transistor 28.

The compensated signal, induced due to voltage variation at the output terminal B of the filter, is provided at a collector terminal of the PNP transistor 28. the compensated signal generated by the compensation network increases, or decreases, as the external loading becomes heavier, or lighter, respectively.

The raster vertical scan size control circuit 4 consists of a digital-to-analog converter (DAC) including resistors 30, 32 and a capacitor 34, and a deflection controller 36.

The DAC has a first input terminal connected to the output terminal C of the compensation network. The DAC has a second input terminal for receiving a pulse width modulation (PWM) signal generated by a microprocessor 38. The DAC has an output terminal D for generating a control current. As illustrated in FIG. 1, the DAC consists of resistors 30, 32 and a capacitor 34. A first terminal of the resistor 32 forms the output terminal D of the DAC. A second terminal of the resistor 32 is connected to the common ground via the capacitor 34. A first terminal of the resistor 30 forms the second input terminal of the DAC. A second terminal of the resistor 30 is connected to the second terminal of the resistor 32.

The deflection controller 36 of the raster vertical scan size control circuit 4 has an input terminal for receiving the control current from the output terminal D of the DAC. Moreover, the deflection controller 36 has an output terminal for generating a current 361 to drive the vertical deflection coil. As an embodiment, TDA 4858 IC made by Philips Semiconductor company is selected as the deflection controller 36. As such, the current flowing into the pin no. 18 of TDA 4858 IC is used to control the raster vertical scan size. From the specification of TDA 4858 IC, the voltage of pin no. 18 is maintained at around 5V. A larger vertical scan size is resulted when current flowing into the pin no. 18 increases, and a smaller vertical scan size is resulted when current flowing into the pin no. 18 decreases. In this embodiment, the pin no. 18 connects the first terminal of the resistor 32. As well known in the arts, the vertical scan size adjustment instructed by a user is executed by the microprocessor 38 by outputting a corresponding PWM signal to the first terminal of the resistor 30.

The voltage level developed at the voltage reference terminal A is referenced to the secondary winding 9 of FBT 7. As the external loading changes due to brightness adjustment, the voltage level at the anode of CRT, the voltage at the output terminal B of the filter, the current flowing from the $V_{cc}$ through the resistors 14 and 22 is gradually changed. This leads to the voltage level change at the base terminal of the PNP transistor 28 and, in turn, generates the corresponding compensated signal, e.g. voltage, at the output terminal C of the compensation network of the compensation circuit 3.

In the case of a heavier external loading, e.g. a brighter display condition, in a CRT without high voltage regulation loop, the raster vertical scan size displayed on the CRT is increased by an unexpected amount $\Delta y$. With the compensation circuit introduced in the invention, the voltage level at the output terminal B of the filter is decreased. Furthermore, the voltage level at the base terminal of the transistor 28 is decreased, and the voltage level at the collector terminal C of the transistor 28 increase (but still <5V). As a result, current flowing through the resistor 32 is decreased and the raster vertical scan size is decreased by a devised amount $\Delta y$ through the operation of the deflection controller 36. In other words, the unexpected increased amount $\Delta y$ is offset by the decreased amount $\Delta y$ introduced by the invention.

In the case of a lighter external loading, e.g. a darker display condition, in a CRT without high voltage regulation loop, the raster vertical scan size displayed on the CRT is decreased by an unexpected amount $\Delta y$. With the compensation circuit introduced in the invention, the voltage level at the output terminal B of the filter is increased. Furthermore, the voltage level at the base terminal of the transistor 28 is increased, and the voltage level at the collector terminal C of the transistor 28 decrease. As a result, current flowing through the resistor 32 is increased and the raster vertical scan size is increased by a devised amount $\Delta y$ through the operation of the deflection controller 36. In other words, the unexpected decreased amount $\Delta y$ is offset by the increased amount $\Delta y$ introduced by the invention.

What is claimed is:

1. A raster vertical scan size adjustment circuit of a video display apparatus, said video display apparatus including a flyback transformer (FBT) which includes a primary winding and a secondary winding, the secondary winding having a terminal generating a high voltage to an anode of a cathode ray tube (CRT) of the video display apparatus via an external loading, the secondary winding having a voltage reference terminal, the raster vertical scan size adjustment circuit comprising:

means for providing a compensated signal responsive to variation of the external loading, wherein the means comprises a compensation circuit having an input terminal adapted to connect said voltage reference terminal of the secondary winding for detecting voltage change at said voltage refernce terminal responsive to variation of the external loading, the compensation circuit having an output terminal generating the compensated signal, wherein said compensation circuit comprises:

a filter used to remove spike due to horizontal deflection operation of said video display apparatus sensed at the voltage reference terminal of the secondary winding of the FBT, said filter having an output terminal:

a compensation network having an output terminal generating the compensated signal based on voltage variation at the output terminal of said filter;

a raster vertical scan size control circuit, responsive to the compensated signal, for adjusting the raster vertical scan size of the video displayed on the CRT such that the raster vertical scan size is substantially unchanged.

2. The raster vertical scan size adjustment circuit of claim 1, wherein said compensated signal is voltage.

3. The raster vertical scan size adjustment circuit of claim 1, wherein said filter comprises a first capacitor a first terminal of which is connected to said input terminal of the compensation circuit, a second terminal of said first capacitor being connected to a common ground; a second capacitor a first terminal of which forming the output terminal of the filter, a second terminal of said second capacitor being connected to the common ground; a resistor is disposed between the first terminal of said first capacitor and the first terminal of said second capacitor.

4. The raster vertical scan size adjustment circuit of claim 1, wherein said compensation network comprises a PNP transistor, a first resistor, a second resistor, and a third resistor, said first resistor is disposed between a DC power and the output terminal of said filter, said second resistor is disposed between a base terminal of said PNP transistor and the output terminal of said filter, said third resistor is disposed between the DC power and an emitter terminal of said PNP transistor, a collector terminal of said PNP transistor generating the compensated signal.

5. The raster vertical scan size adjustment circuit of claim 4, wherein the compensated signal generated by said compensation network increases as the external loading becomes heavier; and wherein the compensated signal generated by said compensation network decreases as the external loading becomes lighter.

6. The raster vertical scan size adjustment circuit of claim 1, wherein said raster vertical scan size control circuit comprises:
- a digital to analog converter (DAC) having a first input terminal connected to the output terminal of said compensation network, said DAC having an output terminal for generating a control current, said DAC having a second input terminal for receiving a pulse width modulation (PWM) signal;
- a deflection controller having an input terminal for receiving the control current, said deflection controller having an output terminal for controlling the raster vertical scan size.

7. The raster vertical scan size adjustment circuit of claim 6, wherein said PWM signal is generated by a microprocessor.

8. The raster vertical scan size adjustment circuit of claim 6, wherein said DAC comprises a first resistor, a capacitor and a second resistor, a first terminal of the first resistor forming the output terminal of the DAC, a second terminal of the first resistor is connected to the common ground via the capacitor, a first terminal of the second resistor forming the second input terminal of the DAC, a second terminal of the second resistor being connected to the second terminal of the first resistor.

9. The raster vertical scan size adjustment circuit of claim 8, wherein the raster vertical scan size is decreased as current flowing through said first resistor is decreased; and wherein the raster vertical scan size is increased as current flowing through said first resistor is increased.

* * * * *